(12) United States Patent
Davidson et al.

(10) Patent No.: US 7,238,940 B1
(45) Date of Patent: Jul. 3, 2007

(54) METHOD FOR IMAGING A CONCEALED OBJECT

(75) Inventors: James R. Davidson, Idaho Falls, ID (US); Judy K. Partin, Idaho Falls, ID (US); Robert J. Sawyers, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 184 days.

(21) Appl. No.: 11/100,789

(22) Filed: Apr. 6, 2005

(51) Int. Cl.
*G01J 5/00* (2006.01)
(52) U.S. Cl. .................................................. 250/330
(58) Field of Classification Search ................. 250/330
See application file for complete search history.

(56) References Cited

FOREIGN PATENT DOCUMENTS

WO WO 2005019863 A2 * 3/2005

* cited by examiner

*Primary Examiner*—Dave Porta
*Assistant Examiner*—Mindy Vu
(74) *Attorney, Agent, or Firm*—Wells St. John, P.S.

(57) ABSTRACT

A method for imaging a concealed object is described and which includes a step of providing a heat radiating body, and wherein an object to be detected is concealed on the heat radiating body; imaging the heat radiating body to provide a visibly discernible infrared image of the heat radiating body; and determining if the visibly discernible infrared image of the heat radiating body is masked by the presence of the concealed object.

26 Claims, 5 Drawing Sheets

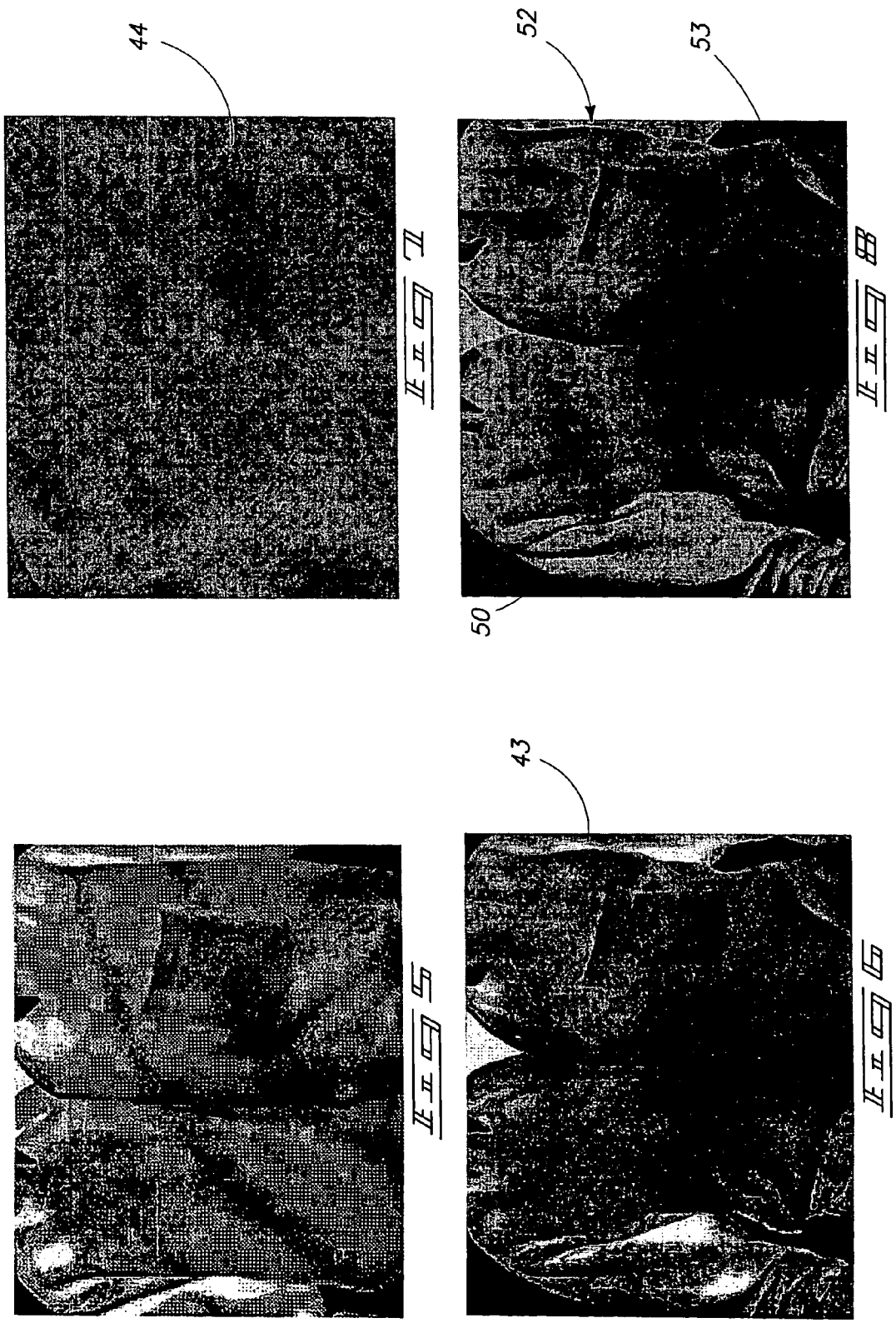

METHOD FOR IMAGING A CONCEALED OBJECT

GOVERNMENT RIGHTS

The United States Government has certain rights in this invention pursuant to Contract No. DE-AC07-05ID14517 between the United States Department of Energy and Battelle Energy Alliance, LLC.

TECHNICAL FIELD

The present invention relates to a method for imaging a concealed object, and more specifically to a method which is useful in determining the presence of an explosive or other harmful substance which is being carried in a concealed location on a person's body.

BACKGROUND OF THE INVENTION

There are various surveillance techniques, and other devices which have been developed heretofore, and which have been utilized by law enforcement, military and security personnel to potentially identify objects which are carried by individuals and which may be utilized to commit a crime, or to harm large numbers of people. For example, various x-ray devices are employed at airports, and other facilities and which are utilized to see the contents of briefcases, luggage and the like. Operators of these devices attempt to review the images produced by these devices to identify contraband, explosives, firearms and similar objects.

Recently, terrorist elements have begun utilizing suicide bombers who secure large amounts of explosives to their body and then detonate the explosives to, on the one hand, destroy property, or to maim and kill large numbers of people. Often these suicide attacks occur in areas such as public places, on busses, and in public thoroughfares, where the identification and/or detection of the person carrying the explosives has been difficult, if not impossible to achieve. Further, proposed solutions to identify individuals carrying explosives have been less than ideal inasmuch as the distances that which such detection can be successfully accomplished are relatively short, and often within the blasting radius of the explosive.

Therefore, a methodology for imaging a concealed object at a suitable standoff distance is the subject matter of the present invention.

SUMMARY OF THE INVENTION

A first aspect of the present invention relates to a method for imaging a concealed object, and which includes, providing a heat radiating body, and wherein an object to be detected is concealed on the heat radiating body; imaging the heat radiating body to provide a visibly discernible infrared image of the heat radiating body; and determining if the visibly discernible infrared image of the heat radiating body is masked by the presence of the concealed object.

Another aspect of the present invention relates to a method for imaging a concealed object, and which includes providing a mammal which emits radiation having wavelengths of about 3 to about 14 micrometers, and wherein the mammal is covered, at least in part, by an opaque covering which conceals the object therebeneath; imaging the mammal at a stand-off distance to produce a first infrared image which is formed from the radiation which is within the band of radiation of about 3 to about 14 micrometers, and wherein the concealed object significantly absorbs a portion of the radiation which is within the band of radiation of about 3 to about 14 micrometers; imaging the mammal at the stand-off distance to produce a second infrared image which is formed from radiation which lies within the band of radiation of about 3 to about 14 micrometers but which is not significantly absorbed by the concealed object; subtracting the second infrared image from the first infrared image to produce a resulting image; providing a visual display device and displaying the resulting image as a visibly discernible image; and inspecting the visibly discernible image to determine the presence of the concealed object underneath the opaque covering of the mammal.

Yet a further aspect of the present invention relates to a method for imaging a concealed explosive object and which includes providing an explosive substance; determining a band of infrared radiation which is absorbed by the explosive substance; selecting a first spectral filter which is operable to pass infrared radiation which lies within the band of radiation which is absorbed by the explosive substance; selecting a second spectral filter which is operable to pass infrared radiation which lies out of the band or radiation which is absorbed by the explosive substance; providing a camera which employs the first and second spectral filters and which forms a first infrared image from the band of radiation which is absorbed by the explosive substance and which is passed by the first spectral filter, and a second infrared image which is formed from the infrared radiation which lies out of the band of radiation that is absorbed by the explosive substance, and which is passed by the second spectral filter; imaging a person who is suspected of concealing the explosive substance under a piece of clothing with the camera; generating the first and second infrared images of the suspect person by employing the camera; subtracting the second infrared image from the first infrared image to provide a resulting image; and inspecting the resulting image to determine the presence of a concealed explosive object by identifying regions under the piece of clothing which absorb infrared radiation which lie within the band of radiation which is absorbed by the explosive substance.

These and other aspects of the subject invention will be described in greater detail hereinafter.

BRIEF DESCRIPTION OF THE DRAWINGS

Preferred embodiments of the invention are described below with reference to the following accompanying drawings.

FIG. 5 is a graphic depiction of an infrared image secured by the methodology of the present invention, and showing a human subject who has no concealed object underneath their clothing.

FIG. 6 is a graphic depiction of a first infrared image secured by the methodology of the present invention and showing a human subject who is concealing an object underneath their clothing.

FIG. 7 shows a second infrared image of the same individual as seen in FIG. 6, and which is formed of infrared radiation which is outside of the band of radiation which forms the first infrared image as seen in FIG. 6.

FIG. 8 is a resulting image of significantly increased contrast and which is formed from the subtraction of the image seen in FIG. 7 from the image seen of FIG. 6 and showing a region of absorbance or masking which clearly identifies a concealed object beneath the clothing of the individual.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
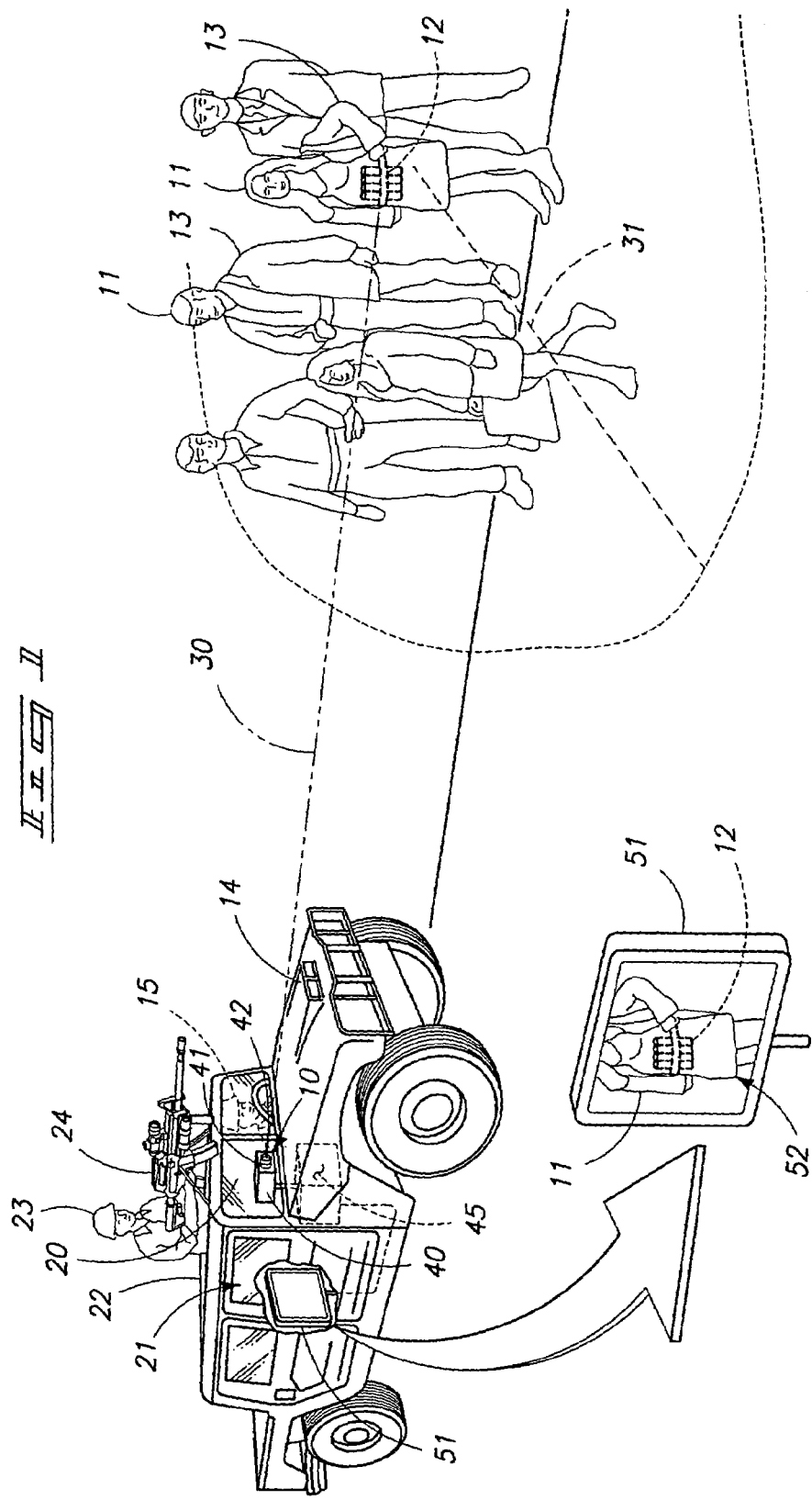
FIG. 1 is a greatly simplified graphic depiction of the present methodology which is utilized on a mobile platform.
Figure 2:
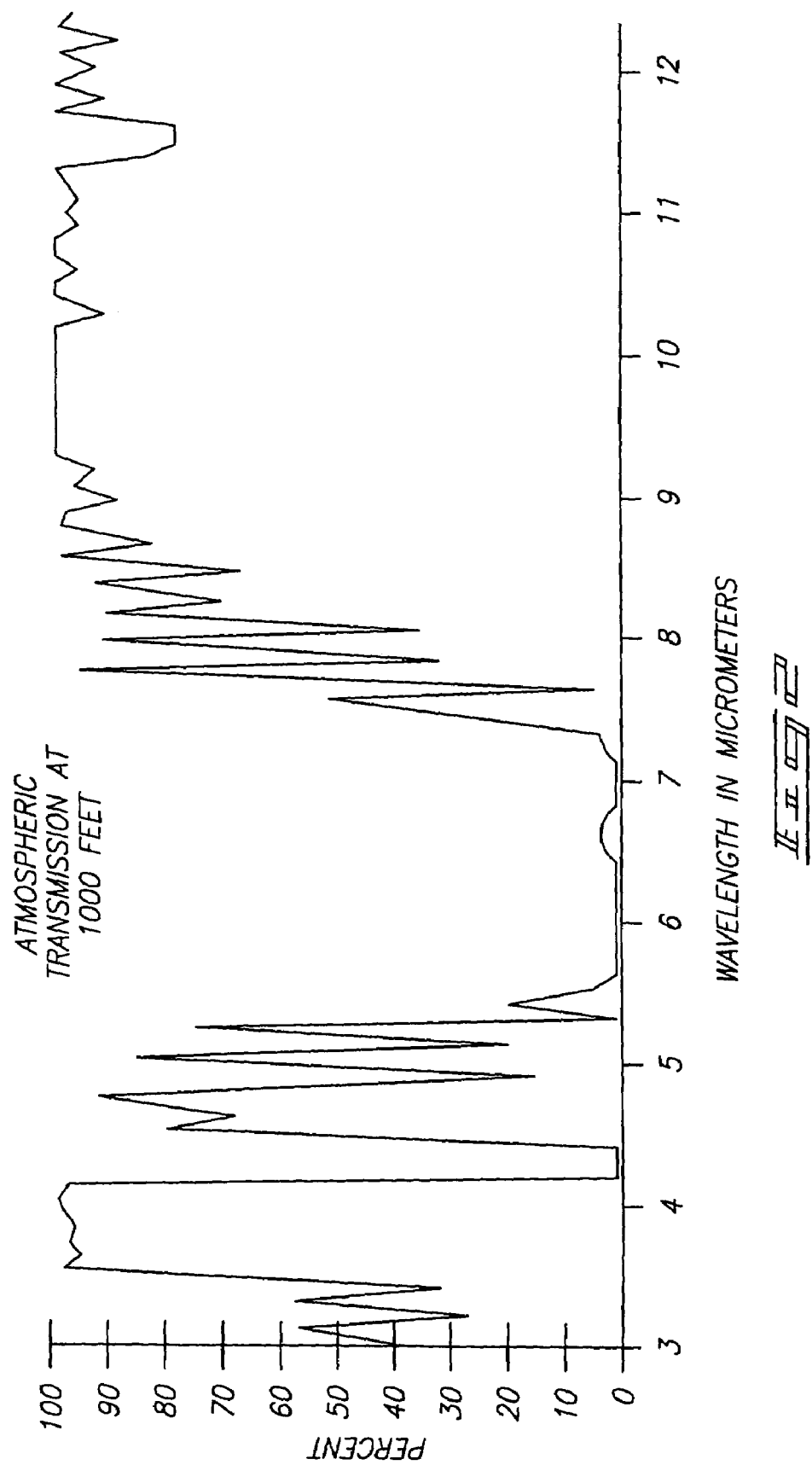
FIG. 2 is a graphic depiction of the amount of atmospheric transmission of infrared radiation generated by a human body and which is measured at a distance of about 1,000 feet.

The methodology of the present invention is best understood by a study of FIGS. 1-8, respectively. Referring now to FIGS. 1 and 2, it will be seen that the present methodology for imaging a concealed object of the present invention, and which is generally indicated by the numeral 10, provides a means whereby a useful image of a mammal 11, and here illustrated as a human, can be formed and then analyzed to determine the presence of a concealed object 12 which is positioned underneath clothing or an opaque covering 13 which is worn by the same person. As understood by a study of FIG. 2, all mammals have a heat radiating body and which generates infrared radiation which lies within a band of radiation about 3 micrometers to about 14 micrometers. As seen in FIG. 2, various portions of this infrared radiation is transmitted, to various degrees in the ambient atmosphere, and can be measured at distances as far away as 1,000 feet. In the methodology as described, the concealed object 12 constitutes an inanimate object and which is selected from the group of inanimate objects which comprise explosives, firearms, ammunition, incendiary materials and contraband of various sorts. In the methodology as described 10 and in one step of the present invention, an explosive substance which might constitute a concealed object 12 is provided, and further the methodology includes a step of determining a band of infrared radiation which is absorbed by the inanimate object and/or explosive substance. Such absorbed infrared radiation will be hereinafter referred to as "in-band radiation." The "in-band" radiation lies within the band of infrared radiation which is emitted by the person, that is, within the range of about 3 to about 14 micrometers, as described above.

Figure 3:
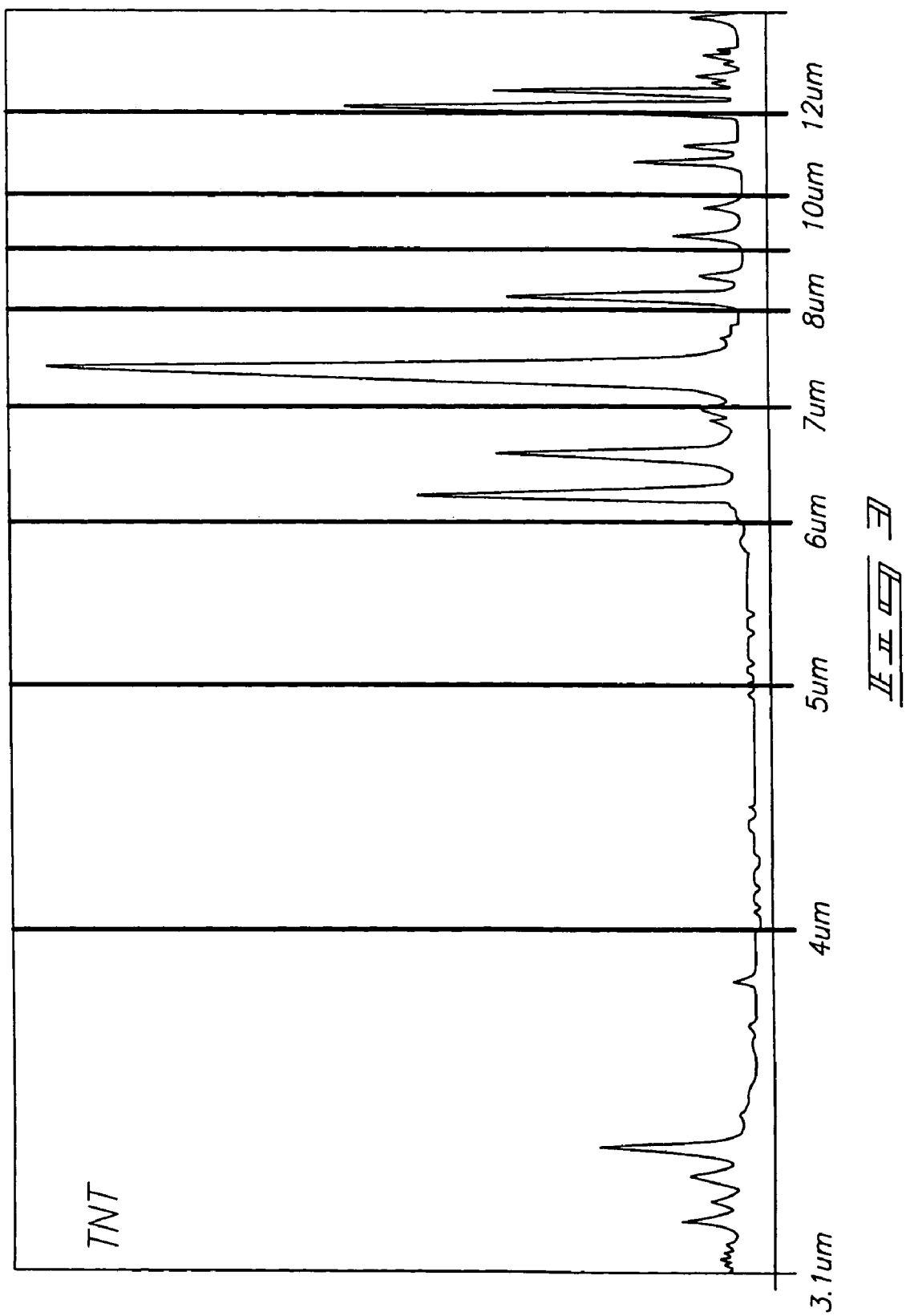
FIG. 3 is a graphic depiction of the absorption of the explosive substance Trinitrotoluene (TNT) in the infrared band of about 3.1 micrometers to about 14 micrometers.
Figure 4:
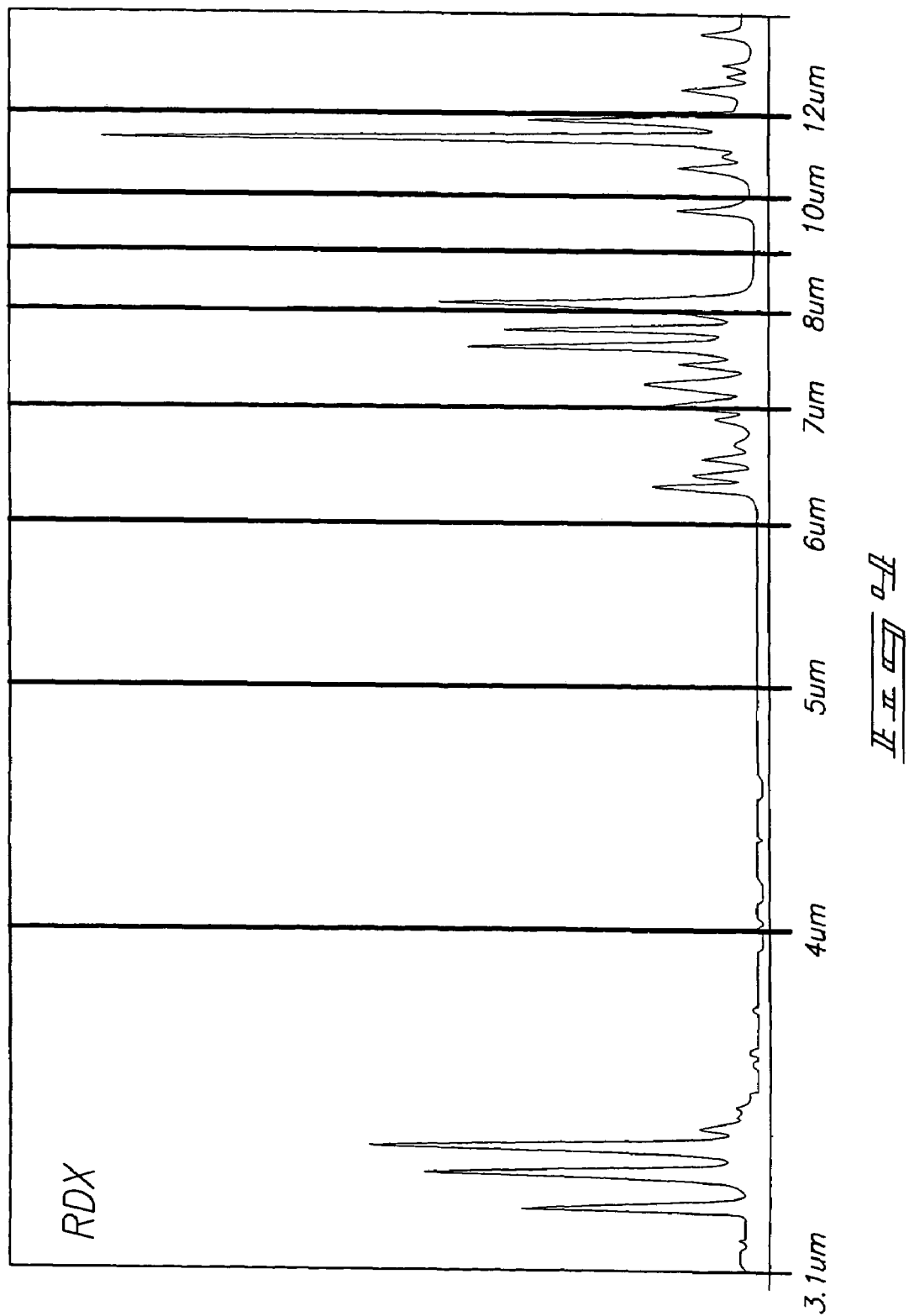
FIG. 4 is a graphic depiction of the infrared absorbance of the explosive substance RDX, and which is taken in the band of about 3.1 micrometers to about 14 micrometers.

Referring now to FIGS. 3 and 4, the infrared absorption characteristics of two explosive substances is shown, that is, Trinitrotoluene (TNT) is illustrated in FIG. 3; and RDX is shown in FIG. 4. It will be observed from studying these two infrared absorption patterns that both these explosive substances absorb greater amounts of radiation in limited bands of radiation within the range of about 3.1 to about 14 micrometers. As should be understood therefore, if the concealed object 12 comprises an explosive substance such as TNT or RDX, then this explosive substance would absorb the emitted radiation of various wavelengths provided by the person 11 in the range of about 3 to 14 micrometers thereby altering the contrast of a visibly discernable infrared image that might be formed from the same radiation. As noted above, the radiation absorbed by the concealed object 12 comprises in-band radiation, and the radiation which is not significantly absorbed by the concealed object or explosive substance and which lies within the range of about 3 to about 14 micrometers will be termed as out-of-band radiation, hereinafter.

Referring now to FIG. 1, it will be seen that the present methodology 10 can be practiced in both stationary and mobile applications. As shown in FIG. 1, the methodology of the present invention is illustrated as being practiced on an earth traversing vehicle 14 such as a Humvee™ which is typically utilized in military and other police operations. The earth traversing vehicle 14 has an operator's position 15, and further mounts a windscreen 20. The earth traversing vehicle 14 further has a passenger or cargo compartment 21. Additionally, the earth traversing vehicle has a roof 22 which has an opening formed therein, and which allows an individual 23 to be positioned in same. As seen in FIG. 1, an automatic weapon 24 is frequently mounted or positioned above the roof of the earth traversing vehicle 14. The automatic weapon provides a means for mitigating risks posed to the earth traversing vehicle and which are identified by either the individual 23 who is controlling the weapon, or the operator of the overland vehicle who is seated in the operator's position 15. As seen in FIG. 1, the present methodology 10, whether conducted in a stationary arrangement, or further mounted on an earth traversing vehicle 14, includes another step of calculating a standoff distance 30 to safely image for a concealed substance 12 which might constitute an explosive material such as TNT, RDX or the like. As a first matter, the standoff distance which is selected is utilized, at least in part, to provide a sufficient time period for the safe mitigation of any threat presented by the concealed object. The mitigation of the threat presented might include engaging the person 11 carrying the concealed object with the automatic weapon 24 as provided for on the earth traversing vehicle 14. Still further, the standoff distance which is typically chosen to be greater than the explosive radius 31 of any explosive substance carried as a concealed object 12 under the clothing 13 of the person 11. In any event, the standoff distance which is selected should provide a sufficient time period to mitigate the threat which is presented by the concealed object 12 once it is identified. In the present methodology, the standoff distance is about 35 to about 165 feet.

Referring still to FIG. 1, it will be seen that the methodology of the present invention 10 is implemented by providing an infrared camera 40 which is operable to provide infrared images of the person 11 and more specifically images of the person 11 which reflects the infrared radiation which lies within the band of radiation of about 3 to about 14 micrometers. A suitable infrared camera can be purchased under the trade name Cedip Infrared Systems, $_{[jkp2]}$FLIR Systems and others. In the methodology 10 as described, and following the step of determining a band of infrared radiation which is absorbed by the explosive substance 12, the methodology includes a further step of selecting a first spectral filter 41 which is mounted on the infrared camera 40 and which is operable to pass in-band infrared radiation which is absorbed by the explosive substance and which represents the concealed object 12. Still further, the methodology as described contemplates a further step of selecting a second spectral filter 42 which is operable to pass out-of-band infrared radiation which is not significantly absorbed by the concealed explosive substance. As should be understood, both the in-band, as well as out-of-band radiation lie within the range of 3 to about 14 micrometers. In the arrangement as shown, the methodology 10 anticipates another step of providing an infrared camera 40 which employs the first and second spectral filters 41 and 42 and which is further operable to form a first infrared image 43 as seen in FIG. 6 from the in-band radiation which is absorbed by the concealed object 12 or explosive substance and which is passed by the first spectral filter 41. FIG. 5 shows an infrared image formed of a human subject and where the individual 11 is not concealing any objects beneath their clothing 13 or other opaque covering. Still further, the infrared camera 40 in the present methodology 10 forms a second infrared image 44 as seen in FIG. 7 and which is formed from out-of-band infrared radiation that is not significantly absorbed by the concealed or explosive object 12 and which is passed by the second spectral filter 42.

In the arrangement as shown, in FIG. 1 an image processor 45 is provided, and which is electrically coupled to the infrared camera 40. In this regard, the infrared camera 40 provides an electrical output which includes both the first and second infrared images 43 and 44 to the image processor 45. The image processor 45 is operable to subtract the second infrared image 44 from the first infrared image 43 to provide a resulting image 50 as seen in FIG. 8 and which has significantly increased contrast. This resulting image is then provided to a visual display device which is generally indicated by the numeral 51 and which presents the resulting image as a visibly discernable infrared image 52. The methodology 10 of the present invention also anticipates a step of inspecting the visibly discernable image to determine the presence of the concealed object 12. As best seen in FIG. 8, the concealed object 12 would be identified as a masked region 53 of the visibly discernable image 52. The methodology as described also anticipates the further step of mitigating any threat 24 presented by the concealed object 12 as earlier discussed. In the arrangement as shown, the method may further include a step of providing a computer which is operable to inspect the resulting image 50, and which can identify the masked region 53 in the resulting image 50 which might conceivably constitute a concealed object 12. Such masked regions would be areas where significant absorption of infrared radiation in the range of about 3 to about 14 micrometers has occurred.

In the methodology as discussed, above, it should be understood that the present invention can be practiced by employing more than one infrared camera 40. Still further, the infrared camera 40 may be manufactured in a form so as to provide image sensors which have pixels which are individually sensitive to the respective in-band and out-of-band radiation which is referenced above.

Operation

The operation of the described embodiment of the present invention is believed to be readily apparent and is briefly summarized at this point.

A method for imaging a concealed object of the present invention 10 is best seen by a study of FIGS. 1-8, respectively. In this regard, a method for imaging a concealed object 12 includes, as a first step, providing a heat radiating body, such as a mammal 11, and wherein an object to be detected 12 is concealed on the heat radiating body; imaging the heat radiating body with a camera 40 to provide a visibly discernible infrared image 52 of the heat radiating body; and determining if the visibly discernible infrared image 52 of the heat radiating body is masked 53 by the presence of the concealed object 12. This is seen most clearly by references to FIG. 8.

More specifically, the methodology 10 for imaging a concealed object 12 of the present invention includes as a first step providing a mammal 11 which emits radiation having wavelengths of about 3 to about 14 micrometers (FIG. 2), and wherein the mammal is covered, at least in part, by an opaque covering 13 which conceals the object 12 therebeneath. The method 10 also anticipates a further step of imaging the mammal at a stand-off distance 30 to produce a first infrared image 43 which is formed from the radiation which is within the band of radiation of about 3 to about 14 micrometers (in-band radiation), and wherein the concealed object 12 significantly absorbs a portion of the radiation which is within the band of radiation of about 3 to about 14 micrometers. The methodology of the present invention further anticipates another step of imaging the mammal 11 at the stand-off distance 30 to produce a second infrared image 44 which is formed from radiation which lies in the range of about 3 to about 14 micrometers but which is not significantly absorbed by the concealed object 12 (out-of-band radiation). The method further includes yet another step of subtracting the second infrared image 44 from the first infrared image 43 to produce a resulting image 50. The method also includes a step of providing a visual display device 51 (FIG. 1) and displaying the resulting image 50 as a visibly discernible image 52. The methodology 10 as described further includes another step of inspecting the visibly discernible image to determine the presence of the concealed object 12 underneath the opaque covering 13 of the mammal 11, and mitigating any threat 24 presented by the concealed object 12. In the methodology as described, it is understood that the concealed object 12 is a threat to humans or property and the standoff distance 30 facilitates, at least in part, the safe mitigation of the threat presented by the concealed object. In the arrangement as seen, the present methodology can be conducted with an infrared camera 40 which employs first and second spectral filters 41 and 42, respectively and which facilitate the formation of the first and second infrared images 43 and 44, respectively. Further, in the arrangement as shown, in-band radiation typically comprises radiation which is absorbed by the concealed object 12 in amounts of greater than about 10%.

A further aspect of the present invention relates to a method 10 for imaging a concealed explosive object 12 and which includes as a first step, providing an explosive substance 12; and further determining a band of infrared radiation which is absorbed by the explosive substance (in-band radiation). This is best seen by reference to FIGS. 3 and 4, respectively. Still further, the methodology includes another step of selecting a first spectral filter 41 which is operable to pass in-band infrared radiation, that is, radiation which lies within the band of radiation which is absorbed by the explosive substance. Still further, the method includes another step of selecting a second spectral filter 42 which is operable to pass infrared radiation which lies outside of the band or radiation which is absorbed by the explosive substance (out-of-band radiation). The method further includes a step of providing a camera 40 which employs the first and second spectral filters 41 and 42 and which forms a first infrared image 43 from the in-band radiation 12, and which is passed by the first spectral filter, and a second infrared image 44 which is formed from the out-of-band infrared radiation, that is, radiation which lies out of the band of radiation that is typically significantly absorbed by the explosive substance, and which is passed by the second spectral filter 42.

The methodology 10 as described above, also anticipates a step of imaging a person 11 who is suspected of concealing an explosive substance 12 under a piece of clothing 13, with the camera 40, and further a step of generating the first and second infrared images 43 and 44 of the suspect person by employing the camera. The method further anticipates a step of subtracting the second infrared image 44 from the first infrared image 43 to provide a resulting image 50. In the methodology as described, another step is provided whereby a visual display device 51, displays the resulting image 50 as a visibly discernible image 52. Still further, the methodology anticipates a step of inspecting the resulting image to determine the presence of a concealed explosive object by identifying regions under the piece of clothing which absorb or mask 53 in-band infrared radiation, that is, radiation which is absorbed by the explosive substance. In the present methodology, this step of inspecting may be done by visually inspecting the resulting image 50 or further by providing a computer, not shown, and which is automated to review the resulting image 50 and provide an alarm when significant portions or areas of the image appear to be masked 53.

Therefore it will be seen that the present methodology 10 for imaging a concealed object provides many advantages over other surveillance techniques which have been utilized heretofore and provides a means by which U.S. military, police, and other security personnel may identify, and then mitigate explosive or other terrorist risks presented by individuals who intend on harming persons or property.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A method for imaging a concealed object comprising:
   providing a heat radiating body, and wherein an object to be detected is concealed on the heat radiating body;
   imaging the heat radiating body to provide a visibly discernible infrared image of the heat radiating body, the visibly discernible infrared image is formed from both in-band and out-of-band radiation which have wavelengths in the range of about 3 to about 14 micrometers; and
   determining if the visibly discernible infrared image of the heat radiating body is masked by the presence of the concealed object.

2. A method as claimed in claim 1, and wherein the heat radiating body is a mammal.

3. A method as claimed in claim 1, and wherein the concealed object is an inanimate object.

4. A method as claimed in claim 1, and wherein the heat radiating body emits radiation having wavelengths of about 3 to about 14 micrometers, and wherein the concealed object absorbs the radiation of various wavelengths in the range of about 3 to about 14 micrometers thereby altering the contrast of the visibly discernible infrared image, and wherein the radiation absorbed by the concealed object comprises in-band radiation, and wherein the radiation which is not significantly absorbed by the concealed object comprises out-of-band radiation.

5. A method as claimed in claim 4, and wherein the step of imaging the heat radiation body further comprises:
   providing a first image sensor which is sensitive to the in-band radiation; and
   providing a second image sensor which is sensitive to the out-of-band radiation.

6. A method as claimed in claim 4, and wherein the step of imaging the heat radiating body further comprises:
   providing an image sensor which has pixels which are individually sensitive to the respective in-band and out-of-band radiation.

7. A method as claimed in claim 1, and further comprising:
   imaging the heat radiating body to provide a second visibly discernible infrared image which is formed from out-of-band radiation; and
   subtracting the second visibly discernible infrared image formed from the out-of-band radiation from the infrared image formed from the in-band radiation to provide a resulting infrared image which will display the concealed object with increased contrast.

8. A method as claimed in claim 1, and wherein the heat radiating body is a human, and the concealed object is selected from the group comprising explosives, firearms, ammunition, incendiary materials, and contraband.

9. A method as claimed in claim 1, and wherein the step of imaging the heat radiating body further comprises:
   providing an infrared imaging device which produces a first in-band infrared image, and a second out-of-band infrared image of the heat radiating body in an electrical output; and
   providing a visual display device which is coupled with the electrical output of the infrared imaging device, and which provides a resulting visibly discernible infrared image which is formed by subtracting the second infrared image from the first infrared image.

10. A method as claimed in claim 9, and further comprising:
    providing a first spectral filter which facilitates the formation of the first in-band infrared image; and
    providing a second spectral filter which facilitates the formation of the second out-of-band infrared image.

11. A method as claimed in claim 9, and wherein the step of providing an infrared imaging device further comprises providing an infrared camera which produces the respective first and second infrared images.

12. A method as claimed in claim 1, and wherein the concealed material is an explosive substance, which if detonated, has an explosion radius, and wherein the step of imaging the heat radiating body occurs at a distance which is greater than the explosion radius of the explosive substance.

13. A method as claimed in claim 1, and wherein the concealed object is a threat to humans or property, and wherein the step of imaging the heat radiating body occurs at a distance which will provide a sufficient time period to mitigate the threat which is presented by the concealed object.

14. A method for imaging a concealed object, comprising:
    providing a mammal which emits radiation having wavelengths of about 3 to about 14 micrometers, and wherein the mammal is covered, at least in part, by an opaque covering which conceals the object therebeneath;
    imaging the mammal at a stand-off distance to produce a first infrared image which is formed from the radiation which is within the band of radiation of about 3 to about 14 micrometers, and wherein the concealed object significantly absorbs a portion of the radiation which is within the band of radiation of about 3 to about 14 micrometers;
    imaging the mammal at the stand-off distance to produce a second infrared image which is formed from radiation which lies within the band of radiation of about 3 to about 14 micrometers but which is not significantly absorbed by the concealed object;
    subtracting the second infrared image from the first infrared image to produce a resulting image;
    providing a visual display device and displaying the resulting image as a visibly discernible image; and inspecting the visibly discernible image to determine the presence of the concealed object underneath the opaque covering of the mammal.

15. A method as claimed in claim 14, and wherein the concealed object is a threat to humans or property, and wherein the stand-off distance facilitates, at least in part, the safe mitigation of the threat presented by the concealed object.

16. A method as claimed in claim 14, and wherein after the step of visibly inspecting the visibly discernible image, the method further comprises:
mitigating any threat presented by the concealed object.

17. A method as claimed in claim 16, and further comprising:
providing an earth traversing vehicle, and wherein the steps of imaging the mammal; displaying the resulting image as a visibly discernible image; inspecting the visibly discernible image; and mitigating any threat presented by the concealed object are conducted, at least in part, from the earth traversing vehicle.

18. A method as claimed in claim 14, and wherein the band of radiation which is significantly absorbed by the concealed object constitutes in-band radiation, and wherein the band of radiation which is not significantly absorbed by the concealed object constitutes out-of-band radiation, and wherein the step of imaging the mammal, further comprises:
providing an imaging device which is sensitive to both the in-band radiation, and the out-of-band radiation, and which further produces the first and second infrared images.

19. A method as claimed in claim 18, and wherein the step of providing the imaging device further comprises:
providing a first spectral filter which facilitates the formation of the first infrared image; and
providing a second spectral filter which facilitates the formation of the second infrared image.

20. A method as claimed in claim 18, and wherein the step of providing the imaging device further comprises:
providing at least two imaging sensors which are individually sensitive to the in-band, and out-of-band radiation.

21. A method as claimed in claim 14, and wherein the significant absorption of the portion of the band of radiation by the concealed object is greater than about 10%.

22. A method for imaging a concealed explosive object:
providing an explosive substance;
determining a band of infrared radiation which is absorbed by the explosive substance;
selecting a first spectral filter which is operable to pass infrared radiation which lies within the band of radiation which is absorbed by the explosive substance;
selecting a second spectral filter which is operable to pass infrared radiation which lies out of the band or radiation which is absorbed by the explosive substance;
providing a camera which employs the first and second spectral filters and which forms a first infrared image from the band of radiation which is absorbed by the explosive substance and which is passed by the first spectral filter, and a second infrared image which is formed from the infrared radiation which lies out of the band of radiation that is absorbed by the explosive substance, and which is passed by the second spectral filter;
imaging a person who is suspected of concealing the explosive substance under a piece of clothing with the camera;
generating the first and second infrared images of the suspect person by employing the camera;
subtracting the second infrared image from the first infrared image to provide a resulting image; and
inspecting the resulting image to determine the presence of a concealed explosive object by identifying regions under the piece of clothing which absorb infrared radiation which lie within the band of radiation which is absorbed by the explosive substance.

23. A method as claimed in claim 22, and wherein the explosive substance absorbs various wavelengths of infrared radiation which lie within a band of radiation which is the range of about 3 to about 14 micrometers.

24. A method as claimed in claim 22, and wherein before the step of imaging the person, the method further comprises:
calculating a stand-off distance to safely image for a concealed explosive substance.

25. A method as claimed in claim 22, and further comprising:
mitigating the risk posed by the person who is concealing the explosive substance under the piece of clothing.

26. A method as claimed in claim 22, and further comprising:
providing a computer which inspects the resulting image and identifies the regions under the piece of clothing which absorb infrared radiation which lies within the band of radiation which is absorbed by the explosive substrate.

* * * * *